United States Patent [19]

Hilligoss, Jr. et al.

[11] 4,371,751
[45] Feb. 1, 1983

[54] AUTOMATIC TELEPHONIC USER EMERGENCY MESSAGE TRANSMITTING APPARATUS

[75] Inventors: William R. Hilligoss, Jr.; Lawrence O. Hilligoss, both of Los Angeles, Calif.

[73] Assignee: Newart Electronic Sciences, Inc., Minneapolis, Minn.

[21] Appl. No.: 138,129

[22] Filed: Apr. 7, 1980

[51] Int. Cl.³ .......................................... H04M 11/04
[52] U.S. Cl. ................................. 179/5 R; 179/2 A; 179/5 P; 179/1 SM
[58] Field of Search .............. 179/2 E, 2 A, 5 R, 5 P, 179/90 K, 90 B, 1 SM; 307/64

[56] References Cited

U.S. PATENT DOCUMENTS

| | | | |
|---|---|---|---|
| 3,662,111 | 5/1972 | Rubinstein | 179/5 P |
| 3,760,121 | 9/1973 | Nissim | 179/90 K |
| 3,808,591 | 4/1974 | Pamicello et al. | 340/27 R |
| 3,816,768 | 6/1974 | Stein | 307/64 X |
| 3,843,841 | 10/1974 | Rubinstein | 179/2 E X |
| 3,885,108 | 5/1975 | Zock | 179/5 R X |
| 3,899,645 | 8/1975 | Brafman | 179/5 R X |
| 3,932,709 | 1/1976 | Hoff et al. | 179/90 B |
| 3,989,900 | 11/1976 | Dibner | 179/5 R X |
| 4,064,368 | 12/1977 | Dibner | 179/5 R |
| 4,086,434 | 4/1978 | Bocchi | 179/2 AM |
| 4,097,690 | 6/1978 | Kuntz et al. | 179/5 R X |
| 4,124,773 | 11/1978 | Elkins | 179/2 A |
| 4,137,429 | 1/1979 | Stockdale | 179/5 R |

FOREIGN PATENT DOCUMENTS 2288430 5/1976 France .
2431803 2/1980 France .

OTHER PUBLICATIONS

"Tired of Just Reading Results", V. B. Tandon, *Electronic Design*, vol. 24, Nov. 22, 1978.

*Primary Examiner*—Stuart N. Hecker
*Attorney, Agent, or Firm*—William B. Barte; Robert E. Granrud

[57] ABSTRACT

An automatic telephonic message transmission apparatus is disclosed which includes a base station and preferably a remote unit for receiving inputs indicative of various operator emergency conditions and for thereupon automatically sequentially dialing a plurality of preselected telephone numbers, and for thereupon transmitting aural messages indicative of the alarm condition. The apparatus includes solid state memories for storing a digital representation of aural messages, keyboard for inputting information such as selected telephone numbers, alarm times, etc., and a controller for acting on the input signals and keyboard entered data for controlling the automatic dialing operations.

9 Claims, 4 Drawing Figures

AUTOMATIC TELEPHONIC USER EMERGENCY MESSAGE TRANSMITTING APPARATUS

BACKGROUND OF THE INVENTION

1. Field of the Invention

This invention relates to automatic telephone dialing and message transmission apparatus enabling emergency messages to be transmitted without any effort on the part of the user.

U.S. Pat. No. 3,662,111 (Rubenstein) depicts a telephone care system that automatically dials a succession of predetermined telephone numbers in the event the user of the system is incapacitated or otherwise unable to reach the telephone system to disable it within a predetermined time after initation of an alarm signal. The system includes a twenty-four hour timer which may be pre-set to initiate the alarm signal several times a day and also allows for manual triggering of the automatic dialing unit in the event of an emergency. It is designed to operate in conjunction with a two-track tape player for reproducing a prerecorded tape having one track containing 1,000 Hz tones simulating dial tones of preselected telephone numbers and having a second track containing at least one voice message. No provision is provided for enabling the user to modify either the selected telephone numbers or the message.

U.S. Pat. No. 3,843,841 (Rubenstein) depicts an improved system which provides a portable remote radio transmitter and a receiver within a base station. A timer for providing the alarm signal is located within the remote unit which can be disabled by the user to prevent the transmission of the alarm signal to the base station which otherwise would cause the automatic dialing and message playback.

Another automatic telephone alarm system depicted in U.S. Pat. No. 3,989,900 (Dibner) provides for automatic dialing of preselected telephone numbers and the playback of prerecorded messages in the event the user does not use his telephone over a 24-hour or shorter period. I.e., each time the telephone is used, a timer in the system is automatically reset, thus preventing the production of an alarm until such time at the telephone is not used over a period greater than that selected. All such systems, operate in conjunction with a tape player containing a record pre-encoded with both preselected telephone numbers and preselected messages and make no provision allowing the user to select or modify such data.

SUMMARY OF THE INVENTION

The present invention concerns an apparatus for automatically transmitting aural messages over a telephone line which provides improved reliability, decreased cost, and greater flexibility of operation, without complicated preinstallation recording procedures previously required on behalf of each user. These advantages are achieved by an apparatus comprising a base station including a solid state message storage means having digitally preencoded therein at least one aural message, a solid-state digital data storage means, and converter means for providing an analog signal capable of generating an aural presentation of said message.

The apparatus further comprises a clock means for providing an alarm-time-signal at a selected alarm time, and means for generating a user-disabled-signal a given length of time after the occurrence of said alarm-time-signal. A means activatable by a user, such as a manually operable switch, is also provided for preventing the generation of the user-disabled-signal. The base station further includes an alphanumeric display, and keyboard means for inputting digital data representing at least one telephone number into the data storage means and into the display for verification. The provision for such input signals and their storage within the base station, together with digitally pre-encoded general alarm messages, enables the user to input telephone numbers of his own choosing, making the apparatus usable without further recording equipment, dealer modifications, or the like. In prior art devices, such numbers were pre-encoded on a magnetic tape via a recorder which was not included with the system, and which would, presumably, only be available to and used by servicing or installation personnel. Desirably, the keyboard further enables user input of a specific operator identification code as well as ready modification of desired alarm time and on-going time settings.

In addition to the above discussed features, the base station further includes central means responsive to the user-disabled-signal for activating the data storage means to provide on an output terminal a signal train capable of initiating automatic dialing of the selected number and for activating the message storage means to transmit on the output terminal the analog signal.

Preferably, the apparatus further includes inputs for two additional input signals indicative of other alarm conditions, such as may be provided by fire and burglary sensors, in which event the control means is adapted to process such signals and to provide an appropriately supplemented aural message. Such an additional input may desirably be provided as a radio receiver within the base station, there then being also included a remote unit including a manually operable switch, an emergency signal generator activated by the switch, and a transmitter for transmitting the emergency signal to the receiver to thereby create a supplemented alarm message indicating an operator emergency.

DESCRIPTION OF THE PREFERRED EMBODIMENT

Figure 1:
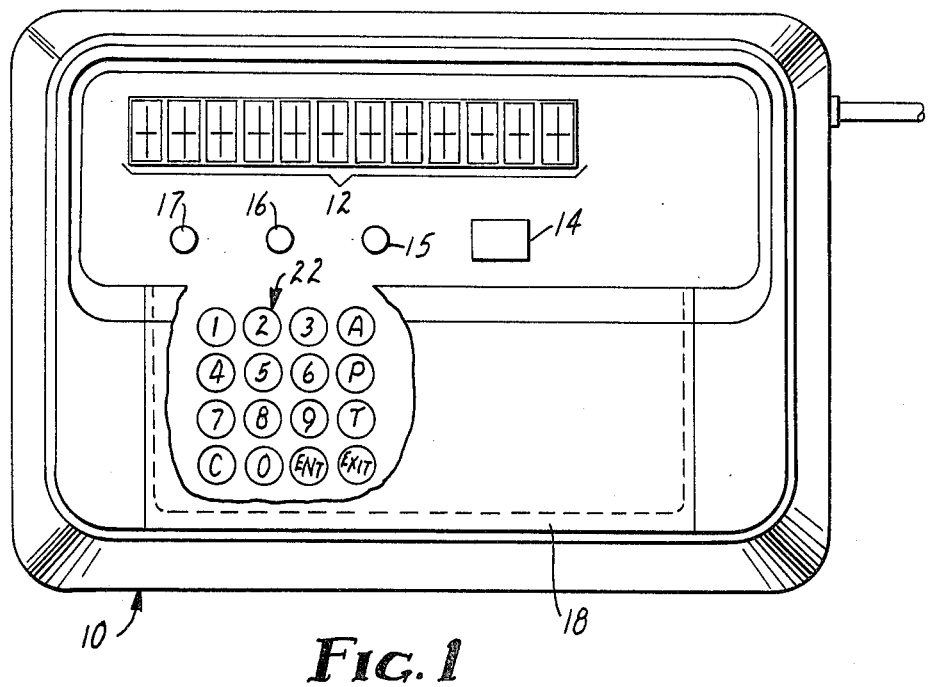
FIG. 1 is a partially broken away top external view of the apparatus of the present invention.
Figure 2:
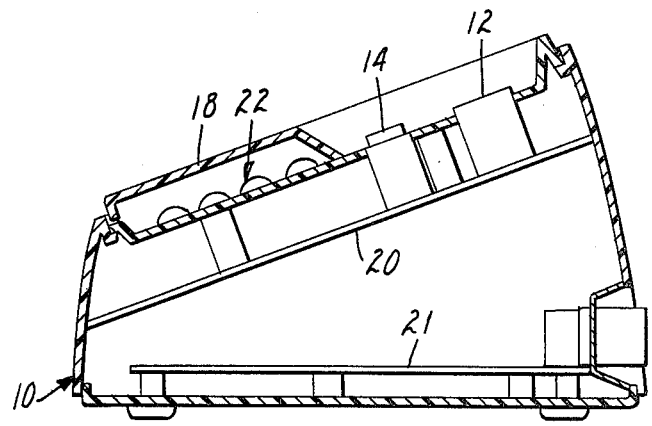
FIG. 2 is a cross-sectional side view of the apparatus shown in FIG. 1.
Figure 3:
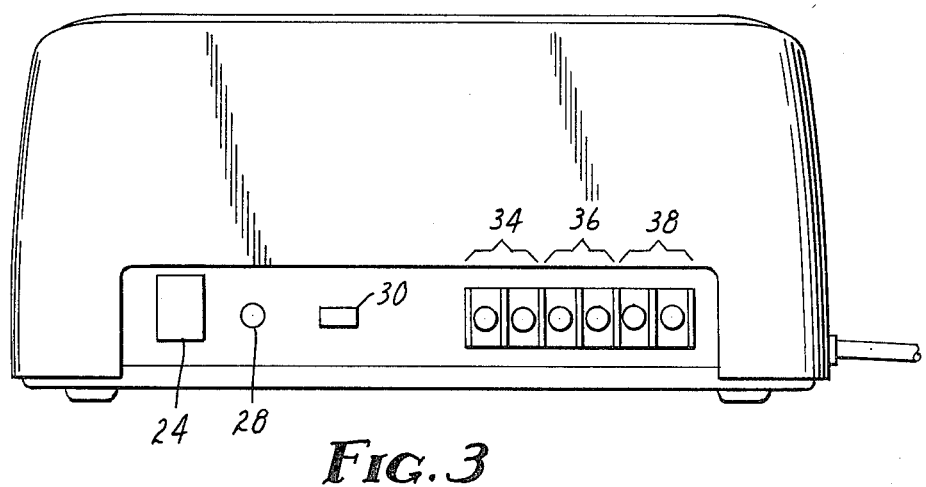
FIG. 3 is a rear external view of the apparatus shown in FIGS. 1 and 2.

FIGS. 1 through 3 are front, side and rear views, respectively, of a preferred embodiment of the apparatus of the present invention. As shown in FIGS. 1 and 2, the top panel of the apparatus 10 includes a twelve digit 7-segment display 12, which as described hereinafter is adapted for display of a real time setting, one or more selected alarm time settings, and input data/instructions. Also provided on the top panel is a reset switch 14, an alarm indicator light 15, a power-on indicator light 16, and a home/away keyboard enable indicator light 17. The power-on indicator light 15 is desirably adapted to be lit continuously when 110 V/AC power is supplied, and to flash at approximately once per second when on battery power. Similarly, the home-away light 17 is adapted to be on continuously when a multiposition switch, described in detail hereinafter, is in a "home" position, and to flash at approximately once per second when in an "away" position, and to be off when the switch is in a "keyboard enabled" position. Concealed within a hinged cover 18 is a 16-digital, hexadecimal keyboard 22.

Also evident in the cross-section of FIG. 2 are circuit boards 20 and 21 on which electronic circuits are provided as discussed below. As shown in the rear view of FIG. 3, the apparatus is preferably provided with at least one telephone module jack 24 for coupling the apparatus to existing telephone lines. Furthermore, access is provided at the rear of the enclosure to a volume control 28 for adjusting the intensity of signals provided at a speaker positioned within the interior (not shown). A multi-position switch 30 is provided, such that when positioned in a first position the keyboard 22 is enabled, thus preventing inadvertent operation of the apparatus by one not properly instructed in its operation. In the second position, the apparatus is placed in a "home" operating mode "home" position, while in the third position, in an "away" mode, such that the alarm unit may be partially disabled; thus, for example, leaving the apparatus activated to produce the desired alarm signals in the event of a burglary or fire, but disabling it with respect to operator emergency alarms, such as would be desirable when the operator is away from the premises. Finally, three sets of terminals, 34, 36, and 38, respectively, are provided to enable additional input alarm signals to be provided at terminals 34 and 36, while terminals 38 are provided to enable an external alarm to be connected to the apparatus.

Figure 4:
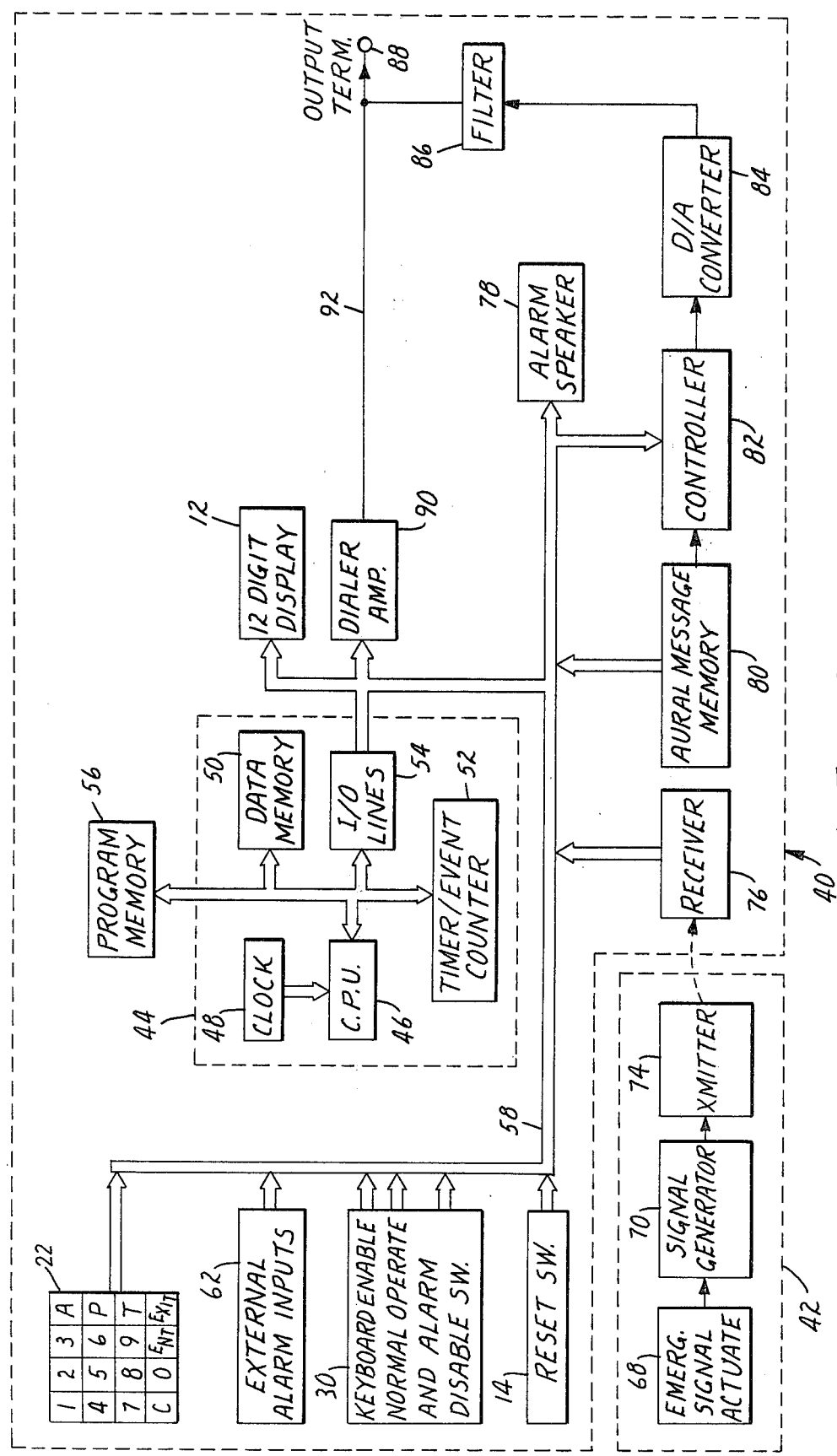
FIG. 4 is a block diagram of a preferred embodiment of the apparatus of FIG. 1.

A block diagram of a preferred electrical configuration of the apparatus shown in FIGS. 1 through 3 is set forth in FIG. 4, and reveals that the apparatus 10 comprises a base station 40 and a remote unit 42. The base unit 40 preferably utilizes a primary control module 44. Such a module is desirably a single component microcomputer such as an Intel Type 8039, 8-bit microcomputer. As shown within the dashed line box, identified as module 44, such a microcomputer includes a central processing unit 46, a clock 48, a data memory 50, a timer and event counter 52, and input/output lines 54. Depending upon the type microcomputer selected for use, an additional program memory 56 may be provided, it being understood that such a memory unit may also be included within the microcomputer 44, if a unit such as an Intel 8049, or equivalent, is selected.

Connected to the microcomputer control module 44 via the input/output lines 54 and the data busses 58, are the associated inputs and outputs of the apparatus. Thus, beginning at the top left of the block diagram, the inputs may be seen to include a 16-digit hexadecimal crossbar keyboard 22 such as is commonly utilized in electronic computing or microprocessor implemented instruments. Other inputs 62 (identified as terminals 34 and 36 in FIG. 3) are provided for receiving alarm signals from external alarms, such as may, for example, be provided by burglary or fire alarm sensors. The keyboard enable normal operate and alarm disable switch 30, and the reset switch 14 are also shown to provide their respective inputs to the data bus 58. The functioning of these various switches and inputs will be discussed in more detail hereinafter.

In a further preferred embodiment, an additional input to the base station 40 is provided by means of the remote unit 42. The remote unit is shown in FIG. 4 to include an include an emergency signal actuation network 68, a signal generator 70, and a radio frequency transmitter 74. Three types of remote units may thus be provided. For example, an emergency transmitter such as Model 0703, manufactured by Fyrnetics Incorporated, 920 Davis Road, Elgin, Ill. 60120, will initiate a transmitted RF signal in response to actuation of a push button switch. Other units may include smoke detectors (Fyrnetics Model 0910) and intrusion detectors (Fyrnetics Models 0700 and 0701), each of which similarly initiate a transmitted RF signal in response to an appropriate stimulation. In such an embodiment, the base station 40 is modified to include an additional input in the form of an RF receiver 76 which is tuned to receive the radio frequency signals broadcast by the transmitter 74. The output from the receiver is coupled on input data bus 58 to the microcomputer module 44.

The base station 40 further includes a solid state aural message storage means 80 which has digitally preencoded therein at least one aural message such as a voice message indicating a general alarm condition. The output from the memory unit 80 is coupled via the bus line 58 to the microcomputer module 44 and also to a controller 82. The controller 82 is also coupled via the data bus line 58 to the microcomputer module 44, and in response to instructions therefrom enables the digital signal from the memory unit 80 to be coupled to a digital-to-analog converter 84. The resultant analog signal from the converter 84 is thereafter coupled through a filter 86 to an output terminal 88.

The data bus lines 58 also couple the microcomputer module 44 to the 12-bit display 12 shown in FIGS. 1 and 2. Finally, the data bus lines 58 couple output signals from the microcomputer module 44 to a dialer amplifier 90 which amplifies signal pulses from the computer 44 and provides the amplified pulses on lead 92 to the output terminal 88.

The inputs from the cross-bar keyboard 22, together with the external alarm inputs 62, and the inputs from switches 14 and 30, are all provided in the data bus 58 on a set of nine leads, forming a 5×4 switch matrix. Thus, in addition to a 4×4 matrix within the keyboard 22, two external alarm inputs, one allocated for a fire sensor and one allocated for a burglary sensor, such as the inputs 34 and 36 shown in FIG. 3, together with the multiposition switch 30, thereby form four additional switchable inputs which, when added to the 4×4 array of the keyboard, form the 5×4 switch matrix. Further, each of the alarm inputs 62 are desirably coupled through conventional optical isolators, such that electrical disturbances, either in the external sensor lines or within the base station 40 are prevented from affecting the other. Such opto-isolators may, for example, be type 4N25 and may include LED's and photodiodes optically coupled together.

The nine leads from the 5×4 switch matrix are coupled to the microcomputer module 44 and thence to the 12-digit display 12 through appropriate solid state latches and driver circuits in a conventional manner. Accordingly, energization of appropriate buttons on the keyboard 22 and of the additional inputs will cause the input signals to be displayed on the 12-digit display unit and to be stored within the microcomputer module 44. The program memory unit 56 is desirably a read-only memory (ROM), such as a National Semiconductor Inc. type MM 52116, which ROM is desirably coupled to the microcomputer module 44 through an address latch module such as a National Semiconductor Inc., Type MM74C373. Since the connections between such components, together with associated drivers and display units, are well known to those skilled in the art and are well set forth in specification sheets available from manufacturers of such components, further details of such interconnections are not here set forth.

As discussed earlier, an additional input to the base station 40 is provided by means of any of the various types of remote unit 42 and the receiver 76 within the base station 40. In all such remote units, a transmitter provides a 10-bit digital code, including a start and 9 data bits modulated on a standard transmitter frequency. Any given code may be generated by clipping selected links provided within the transmitter in order to create a relatively unique binary code. Such transmitter units are commonly utilized, for example, in consumer garage door openers and the like. As shown in FIG. 4, such a remote unit 42 includes an emergency signal actuator 68, such as a conventional push button switch. Upon actuation of such a switch, a signal generator 70 becomes energized so as to provide the unique 10-bit code which is then coupled to a transmitter 74 in a conventional manner so as to provide the desired pulse code modulated radio frequency signal for transmission.

The receiver 76 provided for receiving such a transmitted radio frequency signal may comprise a simple transistorized receiver, the design of which is well known to those skilled in the art. Such a receiver may include a tunable RF stage adapted to be adjusted to receive the RF frequency transmitted by the transmitter 74. A received RF signal may then be coupled to a detector stage to provide on the output bus 58 a series of digital bits corresponding to the selected 9 bit data code utilized in the signal generator of the transmitter unit. If desired, an additional interface amplifier may be provided between the output of the receiver fnd the data bus 58 to provide appropriate adjustments in the voltage levels associated with the receiver and the microcomputer module 44.

The aural message memory unit 80 shown in FIG. 4 is preferably an integrated circuit, National Semiconductor Type MM52132, read only memory (ROM). Such a ROM provides a 4×8 kilobyte capacity, and basically comprises two type MM52116 memory units within the same chip. Such a unit is provided in the base station 40 in a preencoded form, containing a digital representation of a voice message indicative of a general alarm condition. For example, such a message may consist of a short sentence such as "This is your phone care friend"        , at which point other, suitably encoded storage means may supply a specific user identification. After such identification, the message could then continue to indicate "I have a        emergency", and in the place of the second blank, an additional suitably encoded storage means could supply an appropriate word depending upon the type of input signal which caused the production of the general alarm message.

The output from the memory unit 80 is coupled to the controller 82, preferably in a parallel output from such that the controller then comprises a parallel to serial shift register, the output of which is controlled by the microcomputer module 44. A serial output therefrom is coupled to the digital to analog converter 84 such as an integrated circuit type 3417, the output of which is clocked in response to a trigger input from the microcomputer module 44. The output from the converter 84 is further coupled to the filter 86, which may desirably be a Butterworth type filter, consisting of a series of operational amplifiers such as types 741, provided with appropriate RC feedback loops to provide the desired high frequency filtering function. The output from the filter 86 is coupled to the output terminal 88 and may, for example, be preferably coupled through an impedance matching transformer and thence in parallel to the telephone jacks 24 and 26 shown in FIG. 3.

The dialer amplifier 90 may preferably comprise a simple single stage transistor type amplifier to provide sufficient current in response to trigger pulses from the microcomputer module 44 to operate a relay (not shown), the contacts of which are in series with the output of a transformer connected to the output of the filter 86. Accordingly, when the microcomputer module 44 outputs a series of pulses corresponding to preselected telephone numbers, the pulses may activate such a relay and thereby cause the transmission of corresponding pulses on connected telephone lines.

The power supply for the base station 40 such as shown in FIG. 4 is conventional and need not be discussed in detail herein. However, it may be noted that it is preferable to provide a standby battery power supply which is automatically activated in the event of loss of conventional 110 volt AC power. Such an auxiliary DC supply thus provides standby power to the memories within the microprocessor module 44 and to the external program memory 56, such that stored instructions, selected telephone numbers and the like are not erased in the event of a power failure. Further, the apparatus preferably includes conventional AC to DC converters and voltage regulators for maintaining the appropriate voltage levels.

In summary, it may be seen that the base station 40 of the present invention is capable of providing a plurality of trigger signals, each signal being separately identifiable from other signals and indicative of a predetermined operator condition. Such trigger signals preferably include indications (a) that the operator is unable to terminate the alarm signal, (b) that the operator has an immediate emergency, (c) that a fire sensor has been activated, or (d) that a burglary sensor has been activated. The apparatus is further capable of responding to each of the trigger signals by automatically sequentially dialing a plurality of preselected telephone numbers, regardless of responses produced from any of the dialed numbers. Following a short delay after such dialing, the apparatus is capable of transmitting a given aural message over a connected telephone line, the content of which is predicated on which of the trigger signals has resulted in the initiation of the dialing operations.

Upon initially placing the apparatus in operation, the various switches must first be positioned correctly. The multiposition switch 30 should be in the keyboard enable position only when programming the apparatus. At all other times it should be maintained in either the home (normal operation) or away (alarm disable) position to prevent unauthorized entry or attempted alteration of present conditions within the apparatus.

Basically, there is no particular sequence in which input instructions should be entered into the keyboard 22. However, the time of day will always preferably be reset when any input instructions are provided, and will preferably be the last item inputted. The apparatus is desirably provided such that the operator must thus follow three basic steps when inputting instructions. Based on conventional preprogramming, microcomputer module 44 is readily instructed to respond to a variety of inputs from the keyboard 22. Thus, for example, special programmed codes may be established to enable the apparatus to respond to input instructions only upon having first received a particular code. Such special codes are desirable to avoid confusion between the infrequent entry of relatively constant information, such as transmitter codes, preselected telephone numbers and operator codes, as opposed to information which is likely to be changed frequently, such as the actual time and selected alarm times. Accordingly, a selected program code, such as three random numbers, e.g., the sequence 183, may be programmed into the microcomputer module 44 such that the number must be received prior to inputting any of such infrequently altered data.

For example, in order to input a specific transmitter code, a program button (P) on the keyboard 22 would first have to be depressed. Next, the special program code, numbers 183, would be entered, followed by pressing the T button on the keyboard, thus placing the microcomputer module 44 in condition to receive the transmitter code. Following that, a transmitter code number could be entered on the keyboard, followed by pressing the enter key (ENT). Finally, the exit key (EXIT) would be pressed after such information is inputted into the data memory 50 and confirmed by inspection of the display 12.

In like fashion, up to five preselected telephone numbers may similarly be inputted by first pressing the "P" or program key, then the numbers 183, and then the "P" key again. At this time, microcomputer modules having been appropriately pre-programmed, the numbers —0000 on the 12-digit display 12 may be presented to indicate that the module 44 is in condition to accept entry of desired telephone numbers. The operator may then enter up to 5 phone numbers by inserting each of the numbers and pressing the entry key (ENT) between each number sequence. Should a change in any of the numbers be necessary, the operator may press the "clear" or "C" key and reenter. The final step in such operation is again to press the "enter" key, followed by depressing the "exit" key. A long distance telephone number may be entered in the same way as would a direct local number.

In totally analogous fashion, an operator or patient code number may similarly be inserted by first pressing the "P" or program button, the numbers 183, and the operator button (A). Following such activation, the 12-digit display 12 may indicate a "P" to indicate that the microcomputer model 44 is in the correct mode for receiving an operator or patient code number. Upon starting such a patient code number, the "enter" key and then the "exit" key may similarly be operated. Desirably, a 1, 2, 3 or 4 digit code can be entered using the numbers 1, 2, or 3. One hundred and twenty different combinations of operator codes are thus possible. Upon entry of such patient/operator code numbers, the microcomputer module 44 places in its memory a sequence of digital equivalents corresponding to an aural message containing that number sequence. Accordingly, upon receipt of an emergency alarm signal, the microcomputer 44 then outputs from the memory that digital sequence, which is fed to the controller 82 and thence through the digital analog converter 84 to provide an analog output of the operator number in appropriate location in the output aural message.

In contrast to the insertion of the transmitter, operator, and telephone numbers, entry of either alarm or real time settings may simply be done by pressing the "A" button on the keyboard. An "A" may then be caused to appear at the left of the display 12, indicating that the microcomputer module 44 is in the correct mode for programming the alarm setting. At this time, the alarm time may then be entered on the keyboard, pressing the "A" button once for an A.M., or twice for a P.M. setting, followed by pressing the enter key and then the exit key such that the entered time setting then shows on the twelve digit display 12. Forty-eight alarm settings may thus be made on either the hour or half hour period. By using the "enter" key before "exit", an operator can step through the settings to confirm the time settings entered and make changes if necessary. The time of day setting will always be the last one made and has to be made after any programming. To so enter the time, press the "T" button on the keyboard, enter the time of day, and "A" for A.M., or depress the "A" button twice for P.M., followed by pressing the "enter" and finally the "exit" buttons. Once such operating instructions are inputted into the apparatus, it may be seen that the apparatus maintains a continuous display on the twelve digit display 12 of the ongoing time.

The base station 40 is also preferably set to sound a preliminary alarm on speaker 78 at the preselected alarm times, typically twice daily. This also initiates the timing of a preset time period, typically extending seven minutes. In the event the reset button 14 is depressed during that period, the preliminary alarm is terminated, and the station returns to a ready state. If, however, the reset button is not activated within the allowed time, or if an appropriate emergency code signal is provided in response to activation of one of the three emergency inputs, i.e., either the operator emergency as provided by the remote unit 42 and receiver 76 or a fire or burglary signal as received by the input terminals 34 and 36, the base station proceeds as follows. First, the automatic sequential dialing of the preselected telephone members is initiated. Pulse trains corresponding to each number are accordingly provided at output terminal 88, each pulse train being spaced apart a time interval selected to accommodate the time required to transmit the general alarm message as appropriately supplemented with the aural message indicating the specific type of alarm present. Each preselected number is thus automatically dialed in sequence, the dialing sequence continuing, regardless of whether any one of the dialed numbers is answered, until the reset button 14 is activated.

At the same time that the automatic dialing sequence is initiated, the microcomputer module 44 instructs the aural message memory 80 to output the general alarm message, and appropriately supplements the general message with the specific aural message depending upon which alarm is present.

While the apparatus of the present invention has thus been discussed in terms of a preferred embodiment utilizing a type 8039 microcomputer module, it may readily be seen that similar functions may likewise be provided using other type microcomputers and also various other types of solid state electronic circuitry. Inasmuch as the instructions for programming such a microcomputer are well known and set forth in the specification sheets for such devices, such details are not here included.

It will be apparent to those of ordinary skill in the art that the invention may thus be practiced by apparatus equivalent to that disclosed herein without departing from the teachings of the invention. The invention is therefore to be limited only by the scope of the following claims.

We claim:

1. Apparatus for automatically transmitting over a telephone line aural messages humanly intelligible as spoken words and indicative of a user emergency, comprising a base station including
   (i) solid-state message storage means having digitally preencoded therein at least one aural message;
   (ii) converter means for providing an analog signal capable of generating an aural presentation of said message;
   (iii) keyboard means for inputting digital data representing at least one telephone number;
   (iv) signal processing means including
       (a) solid-state digital data storage means;
       (b) a clock means for providing an alarm-time-signal at a selected alarm time;
       (c) means for generating a user-disabled-signal a given length of time after the occurrence of said alarm-time-signal;
       (d) control means responsive to said user-disabled-signal for activating said data storage means to provide on an output terminal a signal train capable of initiating automatic dialing of at least one telephone number and for activating said message storage means to transmit on said output terminal said analog signal;
   (v) switch means activatable by a user for preventing the generation of said user-disabled-signal; and
   (vi) an alphanumeric display coupled to said keyboard means and to said signal processing means for enabling verification of keyboard entered data.

2. An apparatus according to claim 1, further comprising means for inputting a user identification-code into said data storage means, and means for activating said data storage means after a predetermined time delay to supplement said aural message with said user-identification-code in humanly intelligible form.

3. An apparatus according to claim 1, further comprising means for inputting to said clock means and to said display signals indicative of an on-going time setting and at least one selected alarm time setting.

4. An apparatus according to claim 1, further comprising means for receiving input signals indicative of at least one additional alarm condition, and means responsive to said additional alarm condition signals for supplementing said aural message with information indicating the type of additional alarm is humanly intelligible form.

5. An apparatus according to claim 1, further comprising means for filtering said analog signal to eliminate high frequency components such as may be generated in the process of transforming said digitally preencoded messages into said analog signal, thus improving the intelligibility thereof.

6. An apparatus according to claim 1, further comprising means for disabling said keyboard means to prevent unauthorized entry of input signals.

7. An apparatus according to claim 1, wherein said base station further comprises receiver means for receiving a radio signal indicative of an operator-emergency and for generating an operator-emergency-alarm-signal in response thereto, and means responsive to said operator-emergency-alarm signal for supplementing said aural message with information indicating an operator emergency, and wherein said apparatus further comprises a remote unit including switch means actuatable by a human operator, means operatively coupled to said switch means for generating an emergency signal in response to said actuation, and transmitter means for transmitting said radio signal in response to said emergency signal.

8. An apparatus according to claim 7, wherein said transmitter means includes means for transmitting a selected code identifying a given remote unit and wherein said base station means includes means responsive to selected transmitter codes entered into said keyboard means for recognizing a selected code in a received radio signal and for providing a unique operator emergency signal matched to a selected code.

9. An apparatus according to claim 1, including means responsive to two levels of inputs on said keyboard, one level requiring the prior input of a special programmed code for enabling response to further inputs on said keyboard, so as to avoid confusion between the infrequent entry of relatively constant information which must be preceded by said special programmed code, and the entry of information likely to be frequently changed.

* * * * *